US008021606B2

(12) United States Patent
Ozaki et al.

(10) Patent No.: US 8,021,606 B2
(45) Date of Patent: Sep. 20, 2011

(54) HYDROGEN STORAGE ALLOY, ITS PRODUCTION METHOD, HYDROGEN STORAGE ALLOY ELECTRODE, AND SECONDARY BATTERY

(75) Inventors: Tetsuya Ozaki, Kyoto (JP); Tetsuo Sakai, Osaka (JP); Manabu Kanemoto, Kyoto (JP); Minoru Kuzuhara, Kyoto (JP); Tadashi Kakeya, Kyoto (JP); Masaharu Watada, Kyoto (JP)

(73) Assignees: GS Yuasa International Ltd., Kyoto (JP); National Institute of Advanced Industrial Science & Technology, Tokyo (JP)

( * ) Notice: Subject to any disclaimer, the term of this patent is extended or adjusted under 35 U.S.C. 154(b) by 874 days.

(21) Appl. No.: 12/063,391

(22) PCT Filed: Aug. 11, 2006

(86) PCT No.: PCT/JP2006/315944
§ 371 (c)(1),
(2), (4) Date: Feb. 8, 2008

(87) PCT Pub. No.: WO2007/018291
PCT Pub. Date: Feb. 15, 2007

(65) Prior Publication Data
US 2009/0104527 A1    Apr. 23, 2009

(30) Foreign Application Priority Data

Aug. 11, 2005  (JP) ................................ 2005-233541
Aug. 29, 2005  (JP) ................................ 2005-247991

(51) Int. Cl.
*C22C 19/00* (2006.01)
*H01M 4/38* (2006.01)

(52) U.S. Cl. .................. 420/455; 423/658.2; 429/218.2; 420/900

(58) Field of Classification Search ................... 96/108; 95/116; 206/0.7; 420/900, 455; 423/648.1, 423/658.2; 429/408, 416, 421, 523, 218.2
See application file for complete search history.

(56) References Cited

U.S. PATENT DOCUMENTS 7,344,677 B2 *   3/2008   Young et al. .................. 420/455
(Continued)

FOREIGN PATENT DOCUMENTS

EP    1 253 654 A1    10/2002
(Continued)

OTHER PUBLICATIONS

International Search Report for PCT/JP2006/315944 mailed Oct. 3, 2006, Japanese Patent Office, 2 pgs.

(Continued)

*Primary Examiner* — Frank M Lawrence
(74) *Attorney, Agent, or Firm* — Sterne, Kessler, Goldstein & Fox, P.L.L.C.

(57) ABSTRACT

A hydrogen storage alloy containing a phase of a chemical composition defined by a general formula $A_{5-x}B_{1+x}C_{24}$: wherein in the general formula $A_{5-x}B_{1+x}C_{24}$, A denotes one or more element(s) selected from rare earth elements; B denotes one or more element(s) selected from a group consisting of Mg, Ca, Sr, and Ba; C denotes one or more element(s) selected from a group consisting of Ni, Co, Mn, Al, Cr, Fe, Cu, Zn, Si, Sn, V, Nb, Ta, Ti, Zr, and Hf; and x denotes a numeral in a range from −0.1 to 0.8: and the phase has a crystal structure belonging to a space group of R-3m and having a length ratio of the c-axis to the a-axis of the lattice constant in a range of 11.5 to 12.5.

11 Claims, 4 Drawing Sheets

○ La (rare earth element)
◉ La/Mg
◉ M (transition metal, Al)

U.S. PATENT DOCUMENTS

2003/0096164 A1    5/2003   Sakai et al.
2004/0170896 A1    9/2004   Murata et al.

FOREIGN PATENT DOCUMENTS

| | | |
|---|---|---|
| JP | 11-323469 | 11/1999 |
| JP | 3015885 | 12/1999 |
| JP | 2002-105564 | 4/2002 |
| JP | 2002-164045 | 6/2002 |
| JP | 3490871 | 11/2003 |
| JP | 2004-263213 | 9/2004 |
| JP | 2005-23341 | 1/2005 |
| WO | WO 01/48841 A1 | 7/2001 |

OTHER PUBLICATIONS

International Preliminary Report on Patentability from the International Bureau of WIPO, issued Feb. 12, 2008, 4 pgs.

* cited by examiner

○ La (rare earth element)

⊗ La/Mg

◉ M (transition metal, Al)

US 8,021,606 B2

HYDROGEN STORAGE ALLOY, ITS PRODUCTION METHOD, HYDROGEN STORAGE ALLOY ELECTRODE, AND SECONDARY BATTERY

TECHNICAL FIELD

The present invention relates to a hydrogen storage alloy having a new phase as a crystal structure, its production method, a hydrogen storage alloy electrode, and a secondary battery using the hydrogen storage alloy electrode.

BACKGROUND ART

A hydrogen storage alloy is an alloy capable of safely and easily storing hydrogen as an energy source. Accordingly, the alloy has drawn lots of attention as a new energy conversion and storage material.

Application fields of the hydrogen storage alloy as a functional material are proposed in a wide range such as storage and transportation of hydrogen, storage and transportation of heat, heat-mechanical energy conversion, separation and refining of hydrogen, separation of hydrogen isotopes, batteries using hydrogen as an active mass, catalysts for synthetic chemistry, and temperature sensors.

For instance, a nickel-hydrogen storage battery using a hydrogen storage alloy as a negative electrode material has following characteristics; (a) having a high capacity; (b) being hardly deteriorated even if supercharged or super discharged; (c) being capable of charging and discharging at high efficiency; and (d) causing no bad effect on the environment and is clean. Therefore, the battery has drawn attention as a consumer battery and its applications and practical uses have been actively promoted.

As described above, since the hydrogen storage alloy has capabilities for various applications in terms of mechanical, physical, and chemical properties, it is listed as one of important materials in future industrial fields.

As an electrode material for a nickel-hydrogen storage battery, which is one application example of such a hydrogen storage alloy, are practically used $AB_5$ type rare earth-Ni type alloys having a $CaCu_5$ type crystal structure. However, the discharge capacity of the alloy is limited to about 300 mAh/g and it is difficult to further increase the capacity in the present state.

On the other hand, recently, rare earth-Mg—Ni type alloys, with which capacity increase is made possible, have drawn attention. These alloys respectively have different and complicated layered structures and it is reported that these alloys show discharge capacities exceeding those of the $AB_5$ type alloys in the case of using them for an electrode. For instance, (1) Japanese Patent No. 3015885 (Patent Document 1) discloses electrodes containing $LaCaMgNi_9$ alloys having a $PuNi_3$ type crystal structure. (2) Japanese Patent Application Laid-Open No. 11-323469 (Patent Document 2) discloses that electrodes containing rare earth-Mg—Ni type alloys having a $CeNi_3$ type, $Gd_2Co_7$ type, or $Ce_2Ni_7$ type structure show a good hydrogen releasing property while keeping high hydrogen storage capacities. (3) Japanese Patent No. 3490871 (Patent Document 3) discloses that particles of hydrogen storage alloys having a $Ce_5Co_{19}$ type crystal structure phase in the surface layer parts and whose composition is defined by a general formula $AB_x$ (x is 3.5 to 5) have a high reaction speed with hydrogen in a hydrogen absorption and desorption process.

Patent Document 1: Japanese Patent No. 3015885
Patent Document 2: Japanese Patent Application Laid-Open No. 11-323469
Patent Document 3: Japanese Patent No. 3490871

DISCLOSURE OF THE INVENTION

Problems to be Solved by the Invention

However, the $AB_{3\ to\ 3.8}$ type rare earth type alloys disclosed in the above-mentioned three patent documents have a problem that although having high hydrogen storage capacities, the alloys are inferior in durability in the case of being used for secondary batteries as compared with the $AB_5$ type rare earth alloys.

Accordingly, the present invention aims to provide a hydrogen storage alloy and a hydrogen storage alloy electrode having a high hydrogen storage capacity and excellent in durability. The invention also aims to provide a secondary battery having a high discharge capacity and scarcely decrease in the capacity retention ratio even after repeated charging and discharging. Further, the present invention also aims to provide a hydrogen storage alloy production method for efficiently producing a hydrogen storage alloy having a high hydrogen storage capacity and excellent in durability.

Means for Solving the Problems

The present inventors have made various investigations to solve the above-mentioned problems and have found a hydrogen storage alloy having a new phase which is excellent in durability and has a high hydrogen storage capacity and have finally accomplished the invention.

A first aspect of the present invention provides a hydrogen storage alloy containing a phase of a chemical composition defined by a general formula $A_{5-x}B_{1+x}C_{24}$, wherein in the general formula $A_{5-x}B_{1+x}C_{24}$, A denotes one or more element(s) selected from rare earth elements; B denotes one or more element(s) selected from a group consisting of Mg, Ca, Sr, and Ba; C denotes one or more element(s) selected from a group consisting of Ni, Co, Mn, Al, Cr, Fe, Cu, Zn, Si, Sn, V, Nb, Ta, Ti, Zr, and Hf, and x denotes a numeral in a range from −0.1 to 0.8 and the phase has a crystal structure belonging to a space group of R-3m and having a length ratio of the c-axis to the a-axis of the lattice constant in a range of 11.5 to 12.5.

The "rare earth elements" described in this description includes Y (yttrium).

In this description, the phase in the first aspect, defined by the general formula $A_{5-x}B_{1+x}C_{24}$, belonging to the space group of R-3m, and having a length ratio of the c-axis to the a-axis of the lattice constant in a range of 11.5 to 12.5, is described as an $A_5BC_{24}$ phase for convenience.

The crystal structure belonging to the space group of R-3m belongs to a rhombohedral system. In a rhombohedral crystal, a relationship a-axis length=b-axis length=c-axis length is established in the lattice constant. However, the a-axis length and the c-axis length described in the first aspect is of a lattice constant in the case that the crystal structure is regarded as a hexagonal system but not a rhombohedral system. Accordingly, the a-axis length and the c-axis length in the first aspect are not equal.

"Defined by a general formula $A_{5-x}B_{1+x}C_{24}$" in the first aspect does not mean that the $A_5BC_{24}$ phase contains no element other than A, B, and C. It naturally means that a trace amount of an element other than A, B, and C may be contained to an extent that the effect of the invention is not affected. For instance, as the element other than A, B, and C, a trace amount of molybdenum, tungsten, palladium, and platinum may be contained.

A second aspect of the present invention provides the hydrogen storage alloy of the first aspect which has a chemical composition defined by a general formula $R1_a Mg_b R2_c R3_d$, wherein in the general formula $R1_a Mg_b R2_c R3_d$, R1 denotes one or more element(s) selected from rare earth elements; R2 denotes at least one element of Ni and Co; R3 denotes at least one element of Mn and Al; and a, b, c, and d denote numerals respectively satisfying $16 \leq a \leq 18$, $3 \leq b \leq 6$, $72 \leq c \leq 78$, $1 \leq d \leq 6$, and $a+b+c+d=100$.

A third aspect of the present invention is characterized in that in the hydrogen storage alloy of the second aspect, the alloy contains La as R1 and both Ni and Co as R2.

A fourth aspect of the present invention is characterized in that in the hydrogen storage alloy of the first aspect, the crystal grain size of the hydrogen storage alloy is 10 to 100 nm.

A fifth aspect of the present invention is characterized in that in the hydrogen storage alloy of the first aspect, the phase contains at least one element of Mn and Al.

A sixth aspect of the present invention is characterized in that in the hydrogen storage alloy of the first aspect, A is one or more element(s) selected from La, Ce, Pr, and Y; B is Mg; and C is one or more element(s) selected from Ni, Co, Mn, Al, Fe, Cu, Zn, Si, Sn, V, Zr, and Hf.

A seventh aspect of the present invention is a hydrogen storage alloy electrode containing the hydrogen storage alloy of any one of the first to sixth aspects as a hydrogen storage medium.

An eighth aspect of the present invention is a secondary battery including the hydrogen storage alloy electrode of the seventh aspect as an anode.

A ninth aspect of the present invention is a method for producing a hydrogen storage alloy containing a phase of a chemical composition defined by a general formula $A_{5-x}B_{1+x}C_{24}$, wherein in the general formula $A_{5-x}B_{1+x}C_{24}$, A denotes one or more element(s) selected from rare earth elements; B denotes one or more element(s) selected from a group consisting of Mg, Ca, Sr, and Ba; C denotes one or more element(s) selected from a group consisting of Ni, Co, Mn, Al, Cr, Fe, Cu, Zn, Si, Sn, V, Nb, Ta, Ti, Zr, and Hf; and x denotes a numeral in a range from −0.1 to 0.8; and the phase has a crystal structure belonging to a space group of R-3m and having a length ratio of the c-axis to the a-axis of the lattice constant in a range of 11.5 to 12.5; and the method includes a first step of producing a melt by heating and melting raw materials in an inert gas atmosphere, a second step of producing a solidified body by solidifying the melt at a cooling speed of not less than 1000 K/second, and a third step of annealing the solidified body at 860 to 980° C. in an inert gas atmosphere in a pressurized state.

A tenth aspect of the present invention is characterized in that in the method for producing the hydrogen storage alloy of the ninth aspect, the inert gas atmosphere for carrying out the annealing is a helium gas atmosphere.

An eleventh aspect of the present invention is characterized in that in the method for producing the hydrogen storage alloy of the ninth or tenth aspect, the chemical composition of the hydrogen storage alloy to be produced is a chemical composition defined by a general formula $R1_a Mg_b R2_c R3_d$ and the raw materials are prepared to satisfy the following: in the general formula $R1_a Mg_b R2_c R3_d$, R1 denotes one or more element(s) selected from rare earth elements; R2 denotes at least one element of Ni and Co; R3 denotes at least one element of Mn and Al; and a, b, c, and d denote numerals respectively satisfying $16 \leq a \leq 18$, $3 \leq b \leq 6$, $72 \leq c \leq 78$, $1 \leq d \leq 6$, and $a+b+c+d=100$.

The phase having a chemical composition defined by the general formula $A_{5-x}B_{1+x}C_{24}$, belonging to a space group of R-3m, and having a length ratio of the c-axis to the a-axis of the lattice constant in a range of 11.5 to 12.5 is a new phase. The first aspect of the present invention provides the hydrogen storage alloy having excellent properties such as a high retention ratio of the hydrogen storage capacity even in the case hydrogen storage and release is repeated and a high hydrogen storage capacity since the alloy contains this new phase.

Accordingly, the secondary battery of the eighth aspect of the present invention has a high discharge capacity and excellent durability with little decrease of a capacity retention ratio even after repeated charging and discharging with such new hydrogen storage alloy.

The ninth aspect of the present invention involves the second step of producing a solidified body by solidifying the melt at a cooling speed of not less than 1000 K/second and the third step of annealing the solidified body at 860 to 980° C. in an inert gas atmosphere in a pressurized state. As a result, the new $A_5 BC_{24}$ phase, a metastable phase which is intrinsically not so stable, can efficiently be produced. Accordingly, in the ninth aspect, the excellent hydrogen storage alloy having both of a high hydrogen storage capacity and a long charge-discharge cycle life can efficiently be produced.

Effects of the Invention

As described above, the hydrogen storage alloy and the hydrogen storage alloy electrode according to the present invention have high hydrogen storage capacities and are excellent in the durability. Further, the secondary battery according to the present invention has a high discharge capacity and scarcely decreases the capacity retention ratio even in the case where charging and discharging are repeated. Further, the hydrogen storage alloy production method according to the present invention is capable of efficiently producing the hydrogen storage alloy having a high hydrogen storage capacity and excellent in the durability.

BEST MODE FOR CARRYING OUT THE INVENTION

The hydrogen storage alloy of the first aspect of the present invention contains a phase of a chemical composition defined by a general formula $A_{5-x}B_{1+x}C_{24}$, wherein in the general formula $A_{5-x}B_{1+x}C_{24}$, A denotes one or more element(s) selected from rare earth elements; B denotes one or more element(s) selected from a group consisting of Mg, Ca, Sr, and Ba; C denotes one or more element(s) selected from a group consisting of Ni, Co, Mn, Al, Cr, Fe, Cu, Zn, Si, Sn, V, Nb, Ta, Ti, Zr, and Hf, and x denotes a numeral in a range from −0.1 to 0.8 and the phase has a crystal structure belonging to a space group of R-3m and having a length ratio of the c-axis to the a-axis of the lattice constant in a range of 11.5 to 12.5.

Such an $A_5BC_{24}$ phase is a new phase which is not contained in conventional $AB_{3\ to\ 3.8}$ type rare earth alloys and $AB_5$ type rare earth alloys.

The quantity of each element in the $A_5BC_{24}$ phase can be measured by carrying out analysis of a pulverized alloy powder by x-ray diffractometry, electron probe microanalysis (EPMA), or the like and analyzing the result by a Rietveld method.

Figure 1:
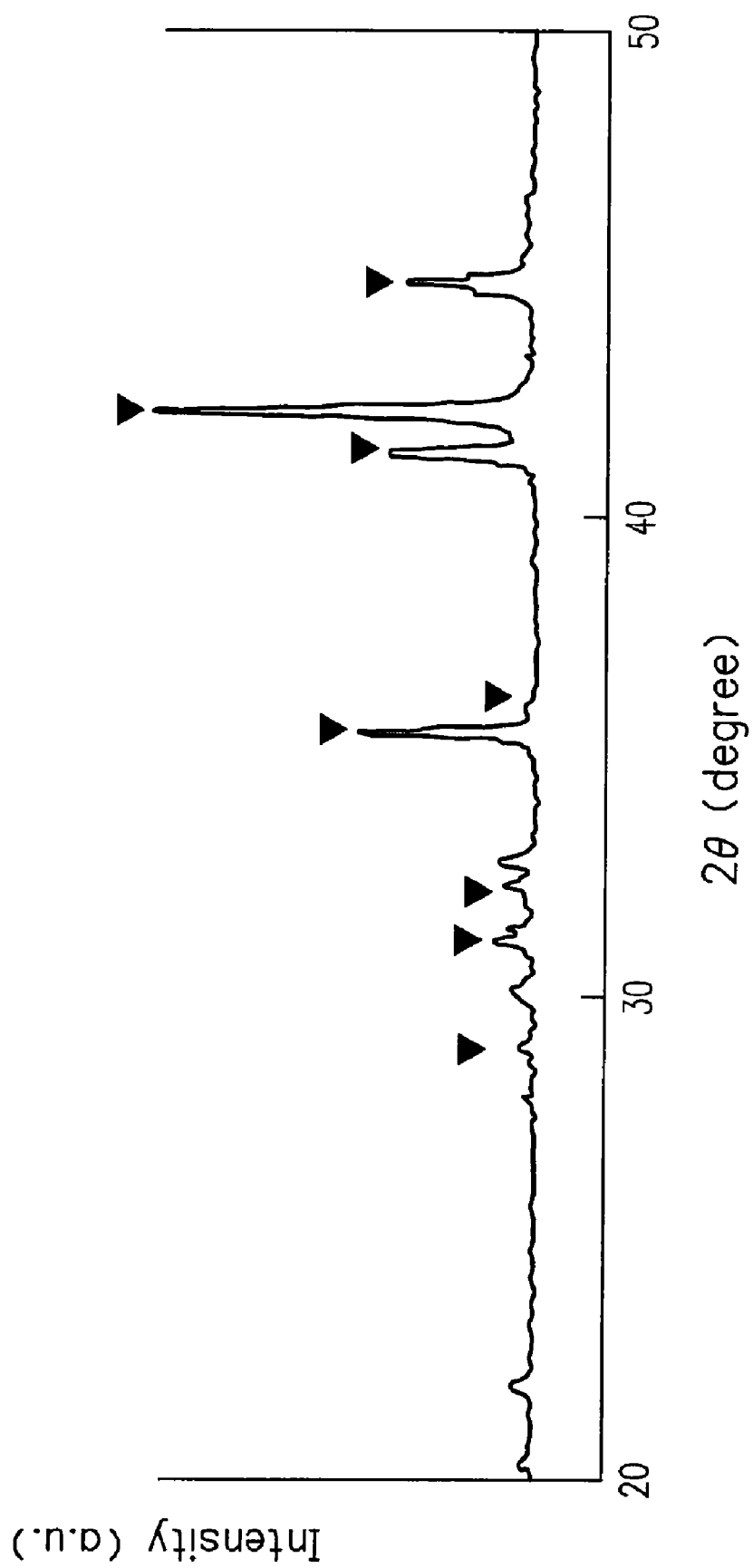
FIG. 1: A drawing showing one example of x-diffraction result of a hydrogen storage alloy of the present invention.

FIG. 1 is a graph showing the measurement result obtained by x-ray diffractometry for a hydrogen storage alloy powder having a chemical composition defined by a formula; $La_{17.0}Mg_{4.3}Ni_{70.0}Co_{6.4}Mn_{1.1}Al_{1.1}$ as one embodiment of a hydrogen storage alloy of the present invention containing the $A_5BC_{24}$ phase.

Herein, the x-ray diffractometry is carried out in the following measurement conditions.
X-ray bulb: Cu—Kα
Acceleration voltage: 40 kV
Electric current: 100 mA
Scanning speed: 2 deg/min
Step angle: 0.02 deg With respect to the hydrogen storage alloy of this embodiment, as shown by ▼ in FIG. 1, a result having peak values of 2θ [deg] at 28.94, 31.16, 32.34, 35.48, 36.04, 41.24, 42.12, and 44.82 is obtained.

Figure 2:
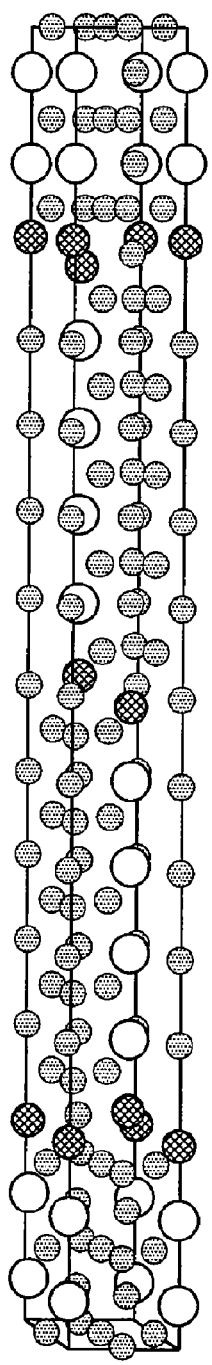
FIG. 2: A drawing three-dimensionally showing a structure model of an $A_5 BC_{24}$ phase.
Figure 3:
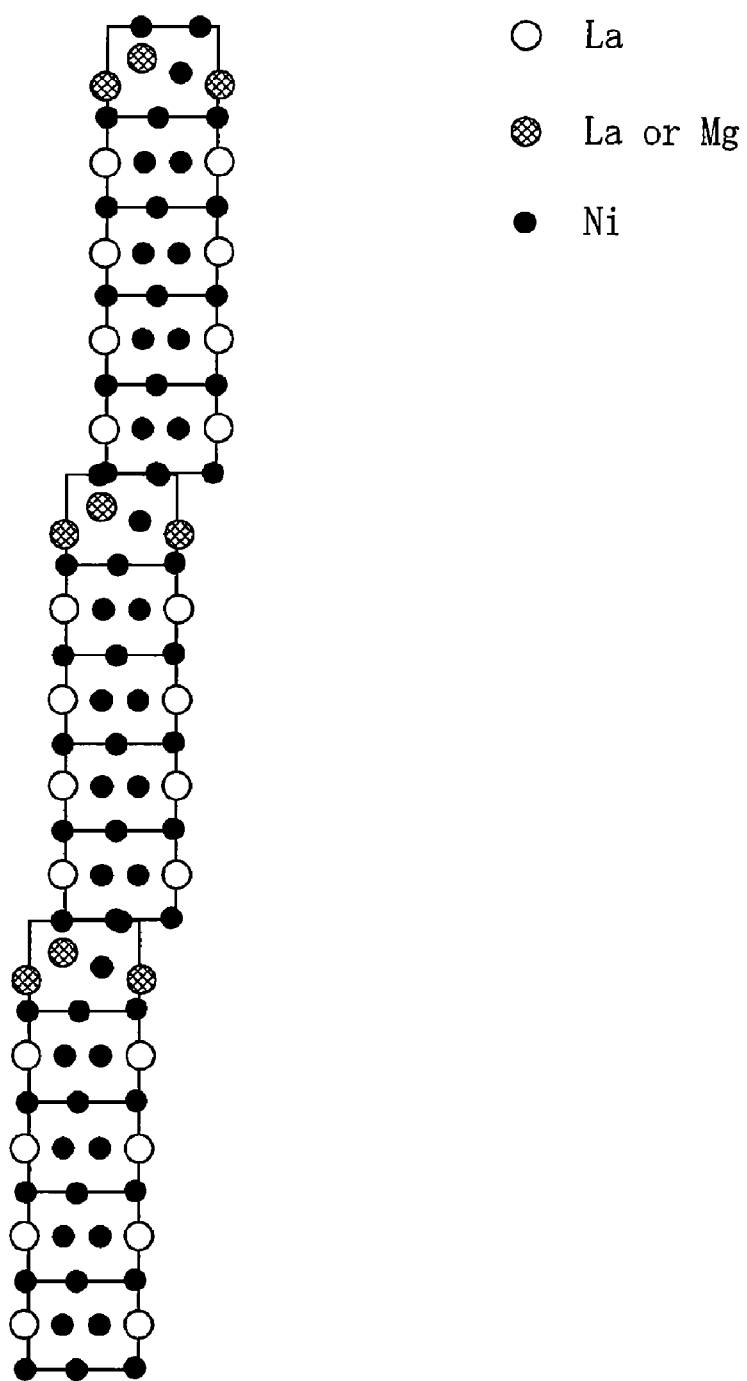
FIG. 3: A drawing two-dimensionally showing a structure model of the $A_5 BC_{24}$ phase.

When structure analysis of the x-ray diffractometry result was carried out by a Rietveld method, it was found that the new $A_5BC_{24}$ phase of this embodiment had the structure model shown in FIG. 2 and FIG. 3.

The practical crystal structure of the new $A_5BC_{24}$ phase is as follows.
Crystal system: rhombohedral system
Space group: R-3m
Lattice parameters: a-axis length=4.98 to 5.08 Å, c-axis length/a-axis length=11.50 to 12.50

It can be understood from Table 9 shown later that the lattice parameters of the $A_5BC_{24}$ phase contained in the hydrogen storage alloy of the present invention are within the above-mentioned ranges.

The new $A_5BC_{24}$ phase contained in the hydrogen storage alloy of the present invention is shown as the crystal structure model in FIG. 3. As can be understood from FIG. 3, the new $A_5BC_{24}$ phase has a structure in which an $ABC_4$ phase is inserted at certain intervals in a layered $AC_5$ phase.

In this structure, the $ABC_4$ phase has a high hydrogen storage capacity. Although being inferior in the hydrogen storage capacity as compared with the $ABC_4$ phase, the $AC_5$ phase has high crystal stability and therefore is excellent in durability in the case hydrogen storage and release is repeated. As described above, due to the structure in which the $ABC_4$ phase is inserted at certain intervals in the layered $AC_5$ phase, it is supposed that the hydrogen storage alloy having a high hydrogen storage capacity and excellent in the durability is formed.

The conventional phase containing the $ABC_4$ phase alone has a disadvantageous point that although it has a large lattice volume and a high hydrogen storage capacity, it is difficult to release hydrogen. The reason for that is because stored hydrogen tends to stably exist among lattices. However, as shown in FIG. 3, with respect to the new $A_5BC_{24}$ phase contained in the hydrogen storage alloy of the present invention, the $ABC_4$ phase and the $AC_5$ phase are layered reciprocally. Therefore, it is supposed that the a-axis length of the $ABC_4$ phase is shortened so as to be compatible with the a-axis length of the $AC_5$ phase. It is supposed, as a result, that the stability of hydrogen positioned among the lattices is decreased and accordingly, it becomes easy to release hydrogen.

FIG. 2 shows a drawing of a unit lattice in the case the $ABC_4$ phase is supposed to have a hexagonal system. Accordingly, the length of the line in the bottom face of the lattice shown in FIG. 2 is an a-axis length and the height of the lattice is a c-axis length.

With respect to the hydrogen storage alloy of the present invention, the content of the $A_5BC_{24}$ phase is not particularly limited, however it is preferably 25 weight % or more in the entire hydrogen storage alloy and more preferably 45 weight % or more. Especially, in the case the content of the $A_5BC_{24}$ phase is 65 weight % or more in the entire hydrogen storage alloy, the hydrogen storage capacity is very high and the durability is also very high.

The second aspect of the present invention provides the hydrogen storage alloy of the first aspect which has a chemical composition defined by a general formula $R1_aMg_bR2_cR3_d$, wherein in the general formula $R1_aMg_bR2_cR3_d$, R1 denotes one or more element(s) selected from rare earth elements; R2 denotes at least one element of Ni and Co; R3 denotes at least one element of Mn and Al; and a, b, c, and d denote numerals respectively satisfying $16 \leq a \leq 18$, $3 \leq b \leq 6$, $72 \leq c \leq 78$, $1 \leq d \leq 6$, and $a+b+c+d=100$.

The eleventh aspect of the present invention provides the method for producing the hydrogen storage alloy of the ninth or tenth aspect, wherein the chemical composition of the hydrogen storage alloy to be produced is a chemical composition defined by a general formula $R1_aMg_bR2_cR3_d$, and in the general formula $R1_aMg_bR2_cR3_d$, R1 denotes one or more element(s) selected from rare earth elements; R2 denotes at least one element of Ni and Co; R3 denotes at least one element of Mn and Al; and the raw materials are prepared such that a, b, c, and d denote numerals respectively satisfying $16 \leq a \leq 18$, $3 \leq b \leq 6$, $72 \leq c \leq 78$, $1 \leq d \leq 6$, and $a+b+c+d=100$.

The composition of the hydrogen storage alloy is limited as defined in the second aspect and the eleventh aspect, so that an effect that the $A_5BC_{24}$ phase can easily be produced can be obtained.

"Defined by a general formula $R1_aMg_bR2_cR3_d$" described in the second and eleventh aspects does not mean that the hydrogen storage alloy contains no element other than R1, Mg, R2 and R3. It naturally means that a trace amount of an element other than R1, Mg, R2 and R3 may be contained to an extent that the effect of the invention is not affected. For instance, as the element other than R1, Mg, R2 and R3, a trace amount of Ca, Sr, Ba, Cr, Fe, Cu, Zn, Si, Sn, V, Nb, Ta, Ti, Zr, Hf, Mo, W, Pd, and Pt may be contained.

In the second aspect and the eleventh aspect of the present invention, it is more preferable that a, b, c, and d respectively satisfy $16.5 \leq a \leq 17.5$, $4.2 \leq b \leq 4.5$, $73 \leq c \leq 77$, and $2 \leq d \leq 5$. If the chemical composition satisfies the above-mentioned numeral ranges, the $A_5BC_{24}$ phase can sufficiently be produced to obtain a hydrogen storage alloy with a very high capacity retention ratio.

In the second aspect of the present invention, it is more preferable that La is contained as R1 and both Ni and Co are contained as R2. If so, it causes an effect to improve the hydrogen storage speed, the service life in the case hydrogen storage and release is repeated, or the ratio of the $A_5BC_{24}$ phase in the alloy.

In the present invention, by addition of at least one element of Mn and Al to the hydrogen storage alloy, the durability of the hydrogen storage alloy can further be improved. The $ABC_5$ phase and the $AC_5$ phase composing the new $A_5BC_{24}$ phase of the hydrogen storage alloy of the present invention show big difference in the volume change in the case of absorbing hydrogen. Therefore, strains are caused in the boundaries between both phases, so that the crystal structure may possibly be changed. It is supposed that the strains may be moderated by intake of Mn and Al in the crystal of the $A_5BC_{24}$ phase. Consequently, the durability of the hydrogen storage alloy may supposedly be improved.

The hydrogen storage alloy of the present invention is preferable to have a primary grain size of 10 to 100 nm. If the primary grain size is controlled within the range of 10 to 100 nm, the volume expansion of the hydrogen storage alloy caused along with the hydrogen storage can be moderated. As a result, powdering of the hydrogen storage alloy is hardly caused. Further, if the primary grain size is controlled within the range of 10 to 100 nm, it becomes easy to cause phase deformation by rearrangement of atoms at the time of heating treatment. Consequently, the $A_5BC_{24}$ phase tends to be produced easily. If the primary grain size exceeds 100 nm, charging and discharging cycle deterioration tends to be caused easily due to the powdering and if it is smaller than 10 nm, deterioration due to oxidation tends to be caused easily.

In this connection, that the primary grain size of 10 to 100 nm means that almost all of the primary grains are in a range from the minimum of 10 nm to the maximum of 100 nm. More specifically, in the case the grain size is measured for arbitrary 100 grains in an electron microscopic photograph, the ratio of the grains having the grain size in a range of 10 to 100 nm is not less than 80% on the basis of surface area. Further, primary grains mean grains having a single-crystal structure of a single crystallite (also called as crystal grains). The method for measuring the grain size of each crystal grain is a method explained in Examples to be described later.

The method for producing the hydrogen storage alloy of the present invention is as follows.

First, based on the chemical composition of the intended hydrogen storage alloy, prescribed amounts of raw material powders of the alloy are weighed and put in a reaction container. Next, the raw material powders are melted using a high frequency melting furnace in an inert gas atmosphere under reduced pressure or normal pressure. Thereafter, to increase the production ratio of a metastable phase, the raw material melt is quenched and solidified at a cooling speed of not lower than 1000 K/second. Further, the solidified raw material is annealed at 860 to 980° C. in an inert gas atmosphere in a pressurized state to produce the new $A_5BC_{24}$ phase according to the present invention at high efficiency.

The ambient atmosphere and temperature conditions at the time of melting and annealing may properly be adjusted in accordance with the alloy composition. In the case the cooling speed is less than 1000 K/second, a stable phase such as a $CaCu_5$ type crystal structure tends to be formed easily. Accordingly, the cooling speed for efficiently producing the $A_5BC_{24}$ phase, the metastable phase, is preferably 1000 K/second or higher. From this viewpoint, the cooling method to be employed may be preferably a melt spinning method with a cooling speed of 100,000 K/second or higher, a gas atomization method with a cooling speed of about 10,000 K/second, a water cooling die casting method with a cooling speed of about 1000 K/second, or a method of quenching and solidifying on a water cooling plate.

At the time of annealing in an inert gas atmosphere, it is preferable that the annealing is carried out in an inert gas atmosphere (e.g. an argon gas or a helium gas) pressurized to 0.1 MPa (gauge pressure) or higher. In such a manner, evaporation of alloys such as Mg from the alloy can be prevented during the heating treatment. Further, as the inert gas is preferably employed a helium gas and the pressurizing condition is preferable to be controlled to 0.2 to 0.5 MPa (gauge pressure). Since helium is excellent in heat conductivity as compared with argon, the temperature difference in a firing furnace is lessened to make it possible to carry out the heating treatment of the alloy at a more uniform temperature. Heat treatment at such a uniform temperature can efficiently prevent the evaporation of alloys such as Mg and makes it possible to produce an alloy having a desired composition and a phase without altering the alloy weight.

Figure 4:
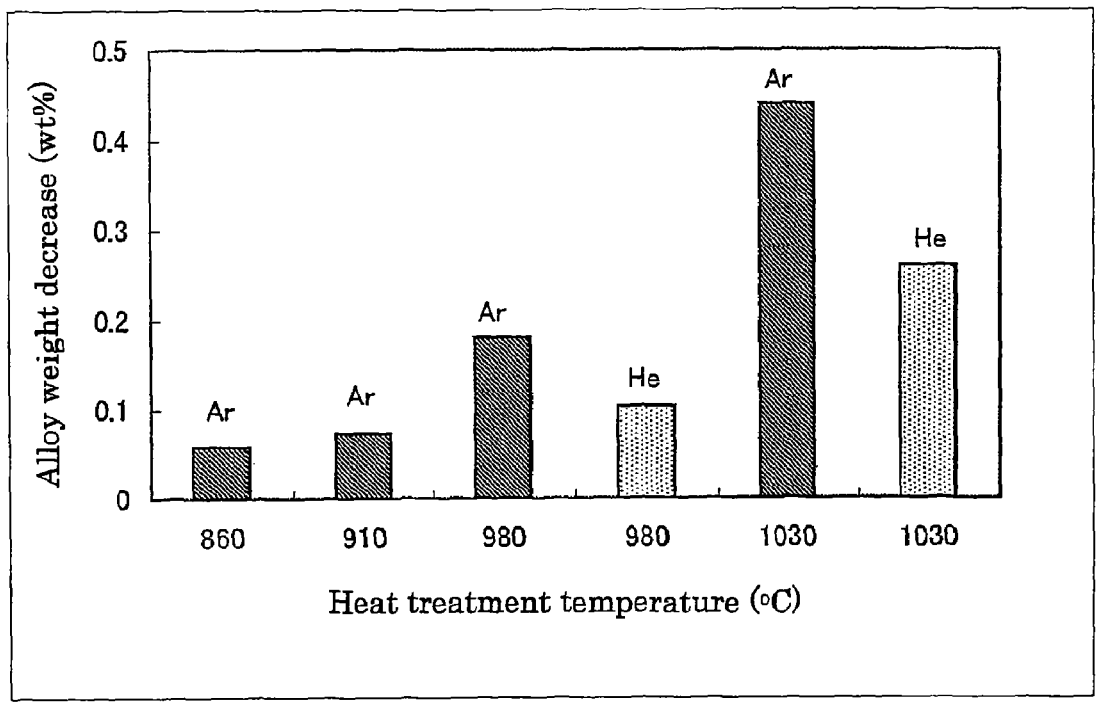
FIG. 4: A graph showing a difference in alloy weight alteration in accordance with the difference of inert gas atmospheres at the time of firing.

FIG. 4 shows a graph for comparing alteration of alloy weights due to annealing in the case of annealing of a hydrogen storage alloy having a chemical composition of $La_{17.0}Mg_{4.3}Ni_{70.0}Co_{6.4}Mn_{1.1}Al_{1.1}$ in an argon gas atmosphere pressurized to 0.2 MPa (gauge pressure) and in the case of annealing in a helium gas atmosphere pressurized to 0.2 MPa (gauge pressure). As shown in FIG. 4, it is understood that the alloy weight decrease is considerably suppressed in the case of using a helium gas as compared with that in the case of using an argon gas.

Further, the above-mentioned heating treatment temperature is 860 to 980° C., however it is preferably 880 to 930° C. If the heating treatment temperature is a temperature higher than 980° C., the ratio of production of the $CuCa_5$ type crystal structure phase, which is a stable phase, is increased and on the other hand, if it is a temperature lower than 860° C., the effect of the heating treatment becomes insufficient and therefore, it is not preferable. If the heating treatment temperature is within the range of 860 to 930° C., it becomes easy to produce the $A_5BC_{24}$ phase as a main phase, that is, the phase highest in the production amount.

In the case the hydrogen storage alloy of the present invention is used as an electrode, it is preferable to pulverize the hydrogen storage alloy. Pulverization may be carried out either before or after annealing, however, since the surface area is increased by the pulverization, it is preferable to carry out pulverization after annealing in terms of prevention of oxidation of the alloy surface. The pulverization is preferable to be carried out in an inert atmosphere for preventing oxidation of the alloy surface. For pulverization, for example, a ball mill or the like may be employed.

If necessary, after powdering, the obtained powder is mixed with a proper binder (e.g. a resin such as polyvinyl alcohol) and water (or another liquid) to obtain a paste-like mixture and the mixture is packed in a nickel porous body and dried and successively the nickel porous body is pressure molded into a desired electrode shape to produce an anode usable for a secondary battery such as a nickel-hydrogen battery.

The anode produced in the above-mentioned manner is assembled with a cathode (e.g. a nickel electrode), an alkaline electrolytic solution and the like to produce a secondary battery (e.g. a nickel-hydrogen battery) of the present invention.

EXAMPLES

Hereinafter, the present invention will be described in more detail with reference to Examples and Comparative Examples, however it is not intended that the present invention be limited to the following Examples.

Example 1

Respectively prescribed amounts of raw material ingots were weighed and put in a crucible to adjust the ratios by mole of elements of a hydrogen storage alloy to 17.0 for La, 4.3 for Mg, 70.2 for Ni, 6.4 for Co, 1.1 for Mn, and 1.1 for Al. The materials were heated to 1500° C. using a high frequency melting furnace in an argon gas atmosphere at a pressure reduced to 0.06 MPa (gauge pressure) and melted. Thereafter, the material melt was transferred to a water cooling mold in the high frequency melting furnace and solidified. Further, the obtained alloy was annealed at 910° C. in a helium gas atmosphere pressurized to 0.2 MPa (gauge pressure, hereinafter the same) to obtain a hydrogen storage alloy of Example 1. The obtained hydrogen storage alloy was mechanically pulverized by a pulverizer in an argon gas atmosphere to adjust the average grain size (D50) to be 60 μm.

Examples 2 to 51

Hydrogen storage alloys of Examples 2 to 51 were produced in the same conditions as described in Example 1, except that the chemical composition was changed so that the mole ratios of respective elements of the hydrogen storage alloys became as described in Table 1 and the annealing temperature was changed to the conditions described in Table 1.

Comparative Example 1 to 14

Hydrogen storage alloys of Comparative Examples 1 to 14 were produced in the same conditions as described in Example 1, except that the chemical composition was changed wo that the mole ratios of respective elements of the hydrogen storage alloys became as described in Table 2 and the annealing conditions were changed to those described in Table 2.

(Measurement of Crystal Structure)

Using an x-ray diffractometry apparatus (product number: M06XCE, manufactured by Bruker AXS) and in conditions of 40 kV and 100 mA (Cu bulb), the x-ray diffractometry was carried out for powders of the hydrogen storage alloys of Examples and Comparative Examples. Based on the obtained x-ray diffraction patterns, structure analysis was carried out by a Rietveld method (using an analysis software program RIETAN 2000). The plane indices and the diffraction angles (peak positions) of the main diffraction peaks of the $A_5BC_{24}$ phase obtained by the Rietveld analysis for Example 1 are shown in Table 3 and the atomic arrangement of the $A_5BC_{24}$ phase is shown in Table 4. Co, Mn, and Al in the $A_5BC_{24}$ phase of the hydrogen storage alloy of Example 1 are positioned in any of the sites of the atoms of Ni1 to Ni8 in Table 4. The contents of produced phases in the respective alloys are shown in Table 5 and Table 6. The $La_5MgNi_{24}$ shown in Table 5 and Table 6 corresponds to the $A_5BC_{24}$ phase of the present invention. The term "as cast" in Table 6 means that no annealing was carried out after casting.

TABLE 1

| | Chemical composition | | | | | | | | | | | | | | | | Annealing conditions | | |
|---|---|---|---|---|---|---|---|---|---|---|---|---|---|---|---|---|---|---|---|
| | La | Ce | Pr | Y | Mg | Ni | Co | Mn | Al | Fe | Cu | Zn | Si | Sn | V | Zr | Hf | Temperature (° C.) | Pressure (MPa) | Atmosphere |
| Example 1 | 17.0 | 0.0 | 0.0 | 0.0 | 4.3 | 70.2 | 6.4 | 1.1 | 1.1 | 0.0 | 0.0 | 0.0 | 0.0 | 0.0 | 0.0 | 0.0 | 0.0 | 910 | 0.2 | He |
| Example 2 | 17.0 | 0.0 | 0.0 | 0.0 | 4.3 | 68.1 | 6.4 | 2.1 | 2.1 | 0.0 | 0.0 | 0.0 | 0.0 | 0.0 | 0.0 | 0.0 | 0.0 | 860 | | |
| Example 3 | | | | | | | | | | | | | | | | | | 880 | | |
| Example 4 | | | | | | | | | | | | | | | | | | 930 | | |
| Example 5 | | | | | | | | | | | | | | | | | | 980 | | |
| Example 6 | 17.0 | 0.0 | 0.0 | 0.0 | 4.3 | 68.1 | 6.4 | 4.3 | 0.0 | 0.0 | 0.0 | 0.0 | 0.0 | 0.0 | 0.0 | 0.0 | 0.0 | 860 | | |
| Example 7 | | | | | | | | | | | | | | | | | | 880 | | |
| Example 8 | | | | | | | | | | | | | | | | | | 930 | | |
| Example 9 | | | | | | | | | | | | | | | | | | 980 | | |
| Example 10 | 17.0 | 0.0 | 0.0 | 0.0 | 4.3 | 68.1 | 6.4 | 0.0 | 4.3 | 0.0 | 0.0 | 0.0 | 0.0 | 0.0 | 0.0 | 0.0 | 0.0 | 850 | | |
| Example 11 | | | | | | | | | | | | | | | | | | 880 | | |
| Example 12 | | | | | | | | | | | | | | | | | | 930 | | |
| Example 13 | | | | | | | | | | | | | | | | | | 980 | | |
| Example 14 | 17.0 | 0.0 | 0.0 | 0.0 | 4.3 | 72.3 | 2.1 | 2.1 | 2.1 | 0.0 | 0.0 | 0.0 | 0.0 | 0.0 | 0.0 | 0.0 | 0.0 | 860 | | |
| Example 15 | | | | | | | | | | | | | | | | | | 880 | | |
| Example 16 | | | | | | | | | | | | | | | | | | 930 | | |
| Example 17 | | | | | | | | | | | | | | | | | | 980 | | |
| Example 18 | 17.0 | 0.0 | 0.0 | 0.0 | 4.3 | 64.8 | 11.0 | 2.1 | 2.1 | 0.0 | 0.0 | 0.0 | 0.0 | 0.0 | 0.0 | 0.0 | 0.0 | 860 | | |
| Example 19 | | | | | | | | | | | | | | | | | | 880 | | |
| Example 20 | | | | | | | | | | | | | | | | | | 930 | | |
| Example 21 | | | | | | | | | | | | | | | | | | 980 | | |
| Example 22 | 17.8 | 0.0 | 0.0 | 0.0 | 4.4 | 67.8 | 5.7 | 2.2 | 2.2 | 0.0 | 0.0 | 0.0 | 0.0 | 0.0 | 0.0 | 0.0 | 0.0 | 860 | | |
| Example 23 | | | | | | | | | | | | | | | | | | 880 | | |
| Example 24 | | | | | | | | | | | | | | | | | | 930 | | |
| Example 25 | | | | | | | | | | | | | | | | | | 980 | | |
| Example 26 | 13.3 | 4.2 | 0.0 | 0.0 | 3.3 | 71.9 | 4.2 | 0.0 | 3.1 | 0.0 | 0.0 | 0.0 | 0.0 | 0.0 | 0.0 | 0.0 | 0.0 | 880 | | |
| Example 27 | | | | | | | | | | | | | | | | | | 930 | | |
| Example 28 | 13.3 | 0.0 | 4.2 | 0.0 | 3.3 | 70.8 | 4.2 | 1.0 | 3.1 | 0.0 | 0.0 | 0.0 | 0.0 | 0.0 | 0.0 | 0.0 | 0.0 | 880 | | |
| Example 29 | | | | | | | | | | | | | | | | | | 930 | | |
| Example 30 | 13.3 | 0.0 | 4.2 | 0.0 | 3.3 | 70.8 | 4.2 | 1.0 | 2.1 | 0.0 | 0.0 | 0.0 | 0.0 | 1.0 | 0.0 | 0.0 | 0.0 | 880 | | |
| Example 31 | | | | | | | | | | | | | | | | | | 930 | | |
| Example 32 | 15.4 | 0.0 | 2.1 | 0.0 | 3.3 | 71.9 | 4.2 | 0.0 | 3.1 | 0.0 | 0.0 | 0.0 | 0.0 | 0.0 | 0.0 | 0.0 | 0.0 | 880 | | |
| Example 33 | | | | | | | | | | | | | | | | | | 930 | | |
| Example 34 | 15.6 | 0.0 | 2.1 | 0.0 | 3.4 | 72.6 | 4.2 | 0.0 | 1.1 | 0.0 | 0.0 | 0.0 | 1.1 | 0.0 | 0.0 | 0.0 | 0.0 | 880 | | |
| Example 35 | | | | | | | | | | | | | | | | | | 930 | | |
| Example 36 | 14.9 | 0.0 | 0.0 | 2.1 | 4.3 | 68.1 | 6.4 | 2.1 | 2.1 | 0.0 | 0.0 | 0.0 | 0.0 | 0.0 | 0.0 | 0.0 | 0.0 | 880 | | |
| Example 37 | | | | | | | | | | | | | | | | | | 930 | | |
| Example 38 | 12.5 | 0.0 | 4.2 | 0.0 | 4.2 | 68.8 | 6.3 | 1.0 | 3.1 | 0.0 | 0.0 | 0.0 | 0.0 | 0.0 | 0.0 | 0.0 | 0.0 | 880 | | |
| Example 39 | | | | | | | | | | | | | | | | | | 930 | | |
| Example 40 | 16.8 | 0.0 | 0.0 | 0.0 | 4.2 | 67.4 | 6.3 | 2.1 | 1.1 | 0.0 | 2.1 | 0.0 | 0.0 | 0.0 | 0.0 | 0.0 | 0.0 | 880 | | |

TABLE 1-continued

| | Chemical composition | | | | | | | | | | | | | | | | | Annealing conditions | | |
|---|---|---|---|---|---|---|---|---|---|---|---|---|---|---|---|---|---|---|---|---|
| | | | | | | | | | | | | | | | | | | Temperature | Pressure | |
| | La | Ce | Pr | Y | Mg | Ni | Co | Mn | Al | Fe | Cu | Zn | Si | Sn | V | Zr | Hf | (° C.) | (MPa) | Atmosphere |
| Example 41 | | | | | | | | | | | | | | | | | | 930 | | |
| Example 42 | 16.7 | 0.0 | 0.0 | 0.0 | 4.2 | 68.8 | 6.3 | 2.1 | 1.0 | 0.0 | 0.0 | 1.0 | 0.0 | 0.0 | 0.0 | 0.0 | 0.0 | 880 | | |
| Example 43 | | | | | | | | | | | | | | | | | | 930 | | |
| Example 44 | 16.7 | 0.0 | 0.0 | 0.0 | 4.2 | 68.8 | 6.3 | 2.1 | 1.0 | 0.0 | 0.0 | 0.0 | 0.0 | 0.0 | 0.0 | 1.0 | 0.0 | 880 | | |
| Example 45 | | | | | | | | | | | | | | | | | | 930 | | |
| Example 46 | 16.7 | 0.0 | 0.0 | 0.0 | 4.2 | 68.8 | 5.3 | 2.1 | 1.0 | 0.0 | 0.0 | 0.0 | 0.0 | 0.0 | 0.0 | 0.0 | 1.0 | 880 | | |
| Example 47 | | | | | | | | | | | | | | | | | | 930 | | |
| Example 48 | 12.9 | 0.0 | 4.3 | 0.0 | 4.3 | 71.0 | 2.2 | 0.0 | 4.3 | 1.1 | 0.0 | 0.0 | 0.0 | 0.0 | 0.0 | 0.0 | 0.0 | 880 | | |
| Example 49 | | | | | | | | | | | | | | | | | | 930 | | |
| Example 50 | 12.8 | 0.0 | 4.3 | 0.0 | 4.3 | 70.2 | 4.3 | 0.0 | 3.2 | 0.0 | 0.0 | 0.0 | 0.0 | 0.0 | 1.1 | 0.0 | 0.0 | 880 | | |
| Example 51 | | | | | | | | | | | | | | | | | | 930 | | |

TABLE 2

| | Chemical composition | | | | | | Annealing conditions | | |
|---|---|---|---|---|---|---|---|---|---|
| | | | | | | | Temperature | Pressure | |
| | La | Mg | Ni | Co | Mn | Al | (° C.) | (MPa) | Atmosphere |
| Comparative Example 1 | 17.0 | 4.3 | 70.2 | 6.4 | 1.1 | 1.1 | No annealing | | |
| Comparative Example 2 | | | | | | | 1030 | 0.2 | He |
| Comparative Example 3 | 17.0 | 4.3 | 68.1 | 6.4 | 2.1 | 2.1 | No annealing | | |
| Comparative Example 4 | | | | | | | 1030 | 0.2 | He |
| Comparative Example 5 | 17.0 | 4.3 | 68.1 | 6.4 | 4.3 | 0 | No annealing | | |
| Comparative Example 6 | | | | | | | 1030 | 0.2 | He |
| Comparative Example 7 | 17.0 | 4.3 | 68.1 | 6.4 | 0 | 4.3 | No annealing | | |
| Comparative Example 8 | | | | | | | 1030 | 0.2 | He |
| Comparative Example 9 | 17.0 | 4.3 | 72.3 | 2.1 | 2.1 | 2.1 | No annealing | | |
| Comparative Example 10 | | | | | | | 1030 | 0.2 | He |
| Comparative Example 11 | 17.0 | 4.3 | 63.8 | 10.6 | 2.1 | 2.1 | No annealing | | |
| Comparative Example 12 | | | | | | | 1030 | 0.2 | He |
| Comparative Example 13 | 17.8 | 4.4 | 66.7 | 6.7 | 2.2 | 2.2 | No annealing | | |
| Comparative Example 14 | | | | | | | 1030 | 0.2 | He |

TABLE 3

| Plane indices | | | Peak position (°) |
|---|---|---|---|
| h | k | l | |
| 1 | 0 | 1 | 20.3 ± 0.1 |
| 0 | 0 | 15 | 21.9 ± 0.1 |
| 1 | 0 | 13 | 27.9 ± 0.1 |
| 0 | 1 | 14 | 28.9 ± 0.1 |
| 1 | 0 | 16 | 31.1 ± 0.1 |
| 0 | 1 | 17 | 32.3 ± 0.1 |
| 1 | 0 | 19 | 34.7 ± 0.1 |
| 1 | 1 | 0 | 35.4 ± 0.1 |
| 0 | 1 | 20 | 36.0 ± 0.1 |
| 0 | 1 | 23 | 39.8 ± 0.1 |
| 0 | 2 | 1 | 41.2 ± 0.1 |
| 1 | 1 | 15 | 42.1 ± 0.1 |
| 0 | 0 | 30 | 44.7 ± 0.1 |
| 2 | 0 | 14 | 46.4 ± 0.1 |

TABLE 4

| Atom | Site | Occupation ratio | x | y | z |
|---|---|---|---|---|---|
| La1 | 6c | 1.0 | 0 | 0 | 0.0333 |
| La2 | 6c | 1.0 | 0 | 0 | 0.1 |
| La3/Mg1 | 6c | 0.5/0.5 | 0 | 0 | 0.1567 |

TABLE 4-continued

| Atom | Site | Occupation ratio | x | y | z |
|---|---|---|---|---|---|
| Ni1 | 3b | 1.0 | 0 | 0 | 0.5 |
| Ni2 | 6c | 1.0 | 0 | 0 | 0.2333 |
| Ni3 | 6c | 1.0 | 0 | 0 | 0.3 |
| Ni4 | 6c | 1.0 | 0 | 0 | 0.3667 |

TABLE 4-continued

| Atom | Site | Occupation ratio | x | y | z |
|---|---|---|---|---|---|
| Ni5 | 6c | 1.0 | 0 | 0 | 0.4333 |
| Ni6 | 9e | 1.0 | 0.5 | 0 | 0 |
| Ni7 | 18h | 1.0 | 0.5 | 0.5 | 0.1333 |
| Ni8 | 18h | 1.0 | 0.5 | 0.5 | 0.0667 |

TABLE 5

| | Firing temperature (°C.) | Phase content (wt %) | | | | | | |
|---|---|---|---|---|---|---|---|---|
| | | $Ce_2Ni_7$ | $Gd_2Co_7$ | $Ce_5Co_{1g}$ | $Pr_5Co_{1g}$ | $CaCu_5$ | $AuBe_5$ | $La_5MgNi_{24}$ |
| Example 1 | 910 | 0.0 | 0.79 | 11.03 | 0.0 | 17.38 | 3.24 | 67.55 |
| Example 2 | 860 | 12.68 | 0.0 | 27.67 | 26.21 | 7.64 | 0.0 | 25.80 |
| Example 3 | 880 | 9.43 | 0.0 | 25.30 | 25.31 | 9.84 | 0.0 | 30.12 |
| Example 4 | 930 | 8.47 | 0.0 | 15.46 | 24.40 | 8.81 | 0.0 | 42.86 |
| Example 5 | 980 | 15.61 | 0.0 | 28.97 | 10.89 | 6.94 | 0.0 | 37.59 |
| Example 6 | 860 | 15.43 | 0.0 | 28.56 | 17.27 | 10.54 | 0.0 | 28.20 |
| Example 7 | 880 | 13.85 | 0.0 | 27.44 | 14.56 | 10.75 | 0.0 | 33.40 |
| Example 8 | 930 | 13.44 | 0.0 | 10.01 | 11.01 | 13.44 | 0.0 | 52.10 |
| Example 9 | 980 | 21.14 | 0.0 | 10.12 | 9.43 | 20.21 | 0.0 | 39.10 |
| Example 10 | 860 | 17.80 | 0.0 | 18.92 | 24.22 | 9.56 | 0.0 | 29.50 |
| Example 11 | 880 | 13.60 | 0.0 | 17.82 | 21.65 | 11.83 | 0.0 | 35.10 |
| Example 12 | 930 | 15.67 | 0.0 | 12.46 | 13.54 | 16.23 | 0.0 | 42.10 |
| Example 13 | 980 | 20.71 | 0.0 | 12.90 | 15.12 | 18.89 | 0.0 | 32.38 |
| Example 14 | 860 | 16.43 | 0.0 | 22.39 | 22.31 | 10.47 | 0.0 | 28.40 |
| Example 15 | 880 | 15.42 | 0.0 | 18.65 | 20.19 | 13.40 | 0.0 | 32.34 |
| Example 16 | 930 | 16.72 | 0.0 | 12.23 | 15.34 | 15.21 | 0.0 | 40.50 |
| Example 17 | 980 | 18.76 | 0.0 | 16.37 | 13.54 | 18.21 | 0.0 | 33.12 |
| Example 18 | 860 | 14.75 | 0.0 | 28.45 | 18.45 | 8.95 | 0.0 | 29.40 |
| Example 19 | 880 | 13.49 | 0.0 | 25.43 | 17.65 | 10.23 | 0.0 | 33.20 |
| Example 20 | 930 | 15.16 | 0.0 | 20.76 | 16.54 | 11.34 | 0.0 | 36.20 |
| Example 21 | 980 | 18.42 | 0.0 | 21.21 | 17.11 | 13.06 | 0.0 | 30.20 |
| Example 22 | 860 | 24.56 | 0.0 | 19.92 | 18.54 | 12.78 | 0.0 | 24.20 |
| Example 23 | 880 | 20.68 | 0.0 | 19.75 | 15.63 | 15.72 | 0.0 | 28.22 |
| Example 24 | 930 | 22.19 | 0.0 | 9.63 | 15.28 | 13.98 | 0.0 | 38.92 |
| Example 25 | 980 | 26.48 | 0.0 | 10.16 | 12.29 | 15.87 | 0.0 | 35.20 |
| Example 26 | 880 | 6.70 | 0.0 | 39.28 | 12.58 | 8.21 | 0.0 | 33.23 |
| Example 27 | 930 | 3.60 | 0.0 | 46.47 | 8.01 | 6.25 | 0.0 | 35.67 |
| Example 28 | 880 | 13.12 | 0.0 | 14.52 | 11.37 | 9.75 | 0.0 | 51.24 |
| Example 29 | 930 | 12.61 | 0.0 | 18.12 | 10.08 | 6.23 | 0.0 | 52.96 |
| Example 30 | 880 | 11.52 | 0.0 | 18.22 | 10.80 | 10.55 | 0.0 | 48.91 |
| Example 31 | 930 | 10.05 | 0.0 | 18.62 | 11.04 | 8.90 | 0.0 | 51.39 |
| Example 32 | 880 | 11.28 | 0.0 | 27.95 | 19.35 | 16.11 | 0.0 | 25.31 |
| Example 33 | 930 | 9.35 | 0.0 | 29.46 | 19.79 | 14.28 | 0.0 | 27.12 |
| Example 34 | 880 | 15.47 | 0.0 | 28.70 | 17.85 | 19.27 | 0.0 | 18.71 |
| Example 35 | 930 | 13.29 | 0.0 | 29.38 | 17.11 | 16.76 | 0.0 | 23.46 |
| Example 36 | 880 | 11.76 | 0.0 | 47.61 | 24.85 | 6.50 | 0.0 | 9.28 |
| Example 37 | 930 | 8.90 | 0.0 | 23.46 | 52.75 | 1.40 | 0.0 | 13.49 |
| Example 38 | 880 | 0.0 | 0.0 | 29.87 | 5.30 | 13.41 | 0.0 | 51.42 |
| Example 39 | 930 | 0.0 | 0.0 | 23.97 | 2.77 | 8.89 | 0.0 | 64.37 |
| Example 40 | 880 | 13.08 | 0.0 | 13.27 | 17.11 | 10.95 | 0.0 | 45.59 |
| Example 41 | 930 | 14.19 | 0.0 | 11.15 | 15.88 | 9.20 | 0.0 | 49.58 |
| Example 42 | 880 | 16.24 | 0.0 | 18.03 | 8.06 | 20.11 | 0.0 | 37.56 |
| Example 43 | 930 | 14.29 | 0.0 | 18.43 | 8.52 | 18.78 | 0.0 | 39.98 |
| Example 44 | 880 | 20.12 | 0.0 | 20.32 | 7.76 | 23.46 | 0.0 | 28.34 |
| Example 45 | 930 | 17.19 | 0.0 | 17.77 | 8.62 | 21.82 | 0.0 | 34.60 |
| Example 46 | 880 | 23.18 | 0.0 | 20.01 | 5.47 | 24.19 | 0.0 | 27.15 |
| Example 47 | 930 | 17.02 | 0.0 | 16.88 | 8.62 | 22.34 | 0.0 | 35.14 |
| Example 48 | 880 | 10.42 | 0.0 | 35.08 | 7.39 | 20.87 | 5.10 | 21.14 |
| Example 49 | 930 | 5.37 | 0.0 | 41.07 | 5.10 | 15.10 | 3.60 | 29.76 |
| Example 50 | 880 | 12.81 | 0.0 | 40.32 | 3.13 | 25.10 | 7.80 | 10.84 |
| Example 51 | 930 | 10.98 | 0.0 | 42.60 | 4.73 | 17.80 | 5.30 | 18.59 |

TABLE 6

| | Firing temperature (° C.) | Phase content (wt %) | | | | | | |
|---|---|---|---|---|---|---|---|---|
| | | $Ce_2Ni_7$ | $Gd_2Co_7$ | $Ce_5Co_{19}$ | $Pr_5Co_{19}$ | $CaCu_5$ | $AuBe_5$ | $La_5MgNi_{24}$ |
| Comparative Example 1 | as cast | 31.65 | 0.0 | 19.28 | 0.0 | 43.82 | 5.25 | 0.0 |
| Comparative Example 2 | 1030 | 24.62 | 0.0 | 11.00 | 0.0 | 60.57 | 3.80 | 0.0 |
| Comparative Example 3 | as cast | 24.16 | 0.0 | 17.29 | 0.0 | 48.32 | 10.23 | 0.0 |
| Comparative Example 4 | 1030 | 23.08 | 0.0 | 10.99 | 0.0 | 58.28 | 7.65 | 0.0 |
| Comparative Example 5 | as cast | 29.86 | 0.0 | 12.39 | 0.0 | 52.54 | 5.21 | 0.0 |
| Comparative Example 6 | 1030 | 26.54 | 0.0 | 9.88 | 0.0 | 59.77 | 3.81 | 0.0 |
| Comparative Example 7 | as cast | 19.62 | 0.0 | 22.41 | 0.0 | 51.76 | 6.21 | 0.0 |
| Comparative Example 8 | 1030 | 21.94 | 0.0 | 18.45 | 0.0 | 54.63 | 4.98 | 0.0 |
| Comparative Example 9 | as cast | 18.43 | 0.0 | 20.49 | 0.0 | 52.87 | 8.21 | 0.0 |
| Comparative Example 10 | 1030 | 21.12 | 0.0 | 6.90 | 0.0 | 61.78 | 10.20 | 0.0 |
| Comparative Example 11 | as cast | 24.56 | 0.0 | 21.44 | 0.0 | 49.89 | 4.11 | 0.0 |
| Comparative Example 12 | 1030 | 28.49 | 0.0 | 6.19 | 0.0 | 58.21 | 7.11 | 0.0 |
| Comparative Example 13 | as cast | 32.45 | 0.0 | 29.47 | 0.0 | 36.10 | 1.98 | 0.0 |
| Comparative Example 14 | 1030 | 35.21 | 0.0 | 24.91 | 0.0 | 34.67 | 5.21 | 0.0 |

The chemical compositions shown in Table 1 are the compositions of the whole of the hydrogen storage alloys containing the $A_5BC_{24}$ phase and not of the $A_5BC_{24}$ phase. However, the respective elements shown in Table 1 are all contained in the $A_5BC_{24}$ phase. This can be confirmed by electron probe microanalysis (EPMA).

In the above-mentioned Examples, not all of the rare earth elements were experimented as the A element of the phase defined as the general formula $A_{5-x}B_{1+x}C_{24}$. However, owing to analogy in the properties among rare earth elements, it is supposed that the similar results could be obtained for rare earth elements for which experiments were not carried out.

In the above-mentioned Examples, Mg was used for the B element of the phase defined as the general formula $A_{5-x}B_{1+x}C_{24}$. However, owing to analogy in the properties among Group IIa elements, it is supposed that the similar results could be obtained for the cases of using Ca, Sr, or Ba belonging to the same Group IIa elements as Mg instead or for the cases of using these Group IIa elements in combination.

(Measurement Method of Average Grain Size)

The average grain size and grain size distribution of the hydrogen storage alloys were measured by a laser diffraction/diffusion method using a grain size analyzer (product number: MT3000, manufactured by MicroTrack Co., Ltd.).

In this connection, the average grain size means a progressive average diameter D50, that is, the grain size at the 50% point of the cumulative curve formed by setting the entire volume of the powder to be 100%. Herein, the average grain size means the average of the size of particles formed by agglomerating primary grains and have become larger than the primary grains which will be described later.

(Measurement Method of Crystal Grain (Primary Grain) Size)

The crystal grain size was measured by measuring the longest length of the long side and the shortest length of the short side of each crystal grain for arbitrary 100 pieces by a transmission electron microscope (H9000, manufactured by Hitachi Ltd.) and carrying out calculation according to the following equation.

Crystal grain size=(long side+short side)/2

(Measurement of Charging and Discharging Property)

(a) Production of Electrode

Mixtures were obtained by adding 3 parts by weight of a nickel powder (#210, manufactured by INCO) to 100 parts by weight of the obtained hydrogen storage alloy powders of Examples and Comparative Examples. The mixtures were further mixed with an aqueous solution containing a thickener (methyl cellulose) dissolved therein and also 1.5 parts by weight of a binder (styrene-butadiene rubber) to produce pastes. Each paste was applied to both faces of a perforated steel plate with a thickness of 45 µm (porosity 60%) and dried and the resulting steel plate was pressed to a thickness of 0.36 mm to obtain an anode. On the other hand, as a cathode, a sintered type nickel hydroxide electrode with an excess capacity was employed.

(b) Production of Opened Type Battery

Each anode produced in the above-mentioned manner was assembled by sandwiching them between the anodes with a separator interposed therebetween to obtain a laminated body. The laminated body was fixed by bolts to apply a pressure of 1 kgf/cm² to the laminated body and an opened type cell was assembled. As an electrolytic solution was employed a mixed solution containing 6.8 mol/L of KOH and 0.8 mol/L of LiOH. As a reference electrode, an Hg/HgO electrode was used.

(c) Measurement of Maximum Discharge Capacity

Each produced battery was put in a water bath at 20° C. and 10 cycles of charging and discharging were carried out in the following conditions.

Charging: charging to 150% of capacity at 0.1 C

Discharging: discharging until the anode potential became −0.6 V (vs. Hg/HgO) at 0.2 ItA The discharge capacity which was the maximum in the 10 cycles was defined as the maximum discharge capacity. The results are shown in Tables 7 and 8. The capacities shown in Tables 7 and 8 are the maximum discharging capacities per weight of the hydrogen storage alloys (mAh/g).

(d) Measurement of Capacity Retention Ratio

Successively to the measurement of the maximum discharge capacity, in the same water bath, 11 to 49 cycles of charging and discharging were carried out in conditions of 150% charging at 0.1 C, discharging at 1.0 ItA, and the final voltage of −0.6 V (vs Hg/HgO) and after the final voltage was turned back again to −6 V (vs Hg/HgO) at 0.2 ItA, the discharge capacity at the 50th cycle was measured.

From the measured discharge capacity at the 10th cycle and discharge capacity at the 50th cycle, the capacity retention ratio (the ratio (%) of the discharge capacity at the 50th cycle to the discharge capacity at the 10th cycle) was calculated. The results are shown in Tables 7 and 8.

Figure 5:
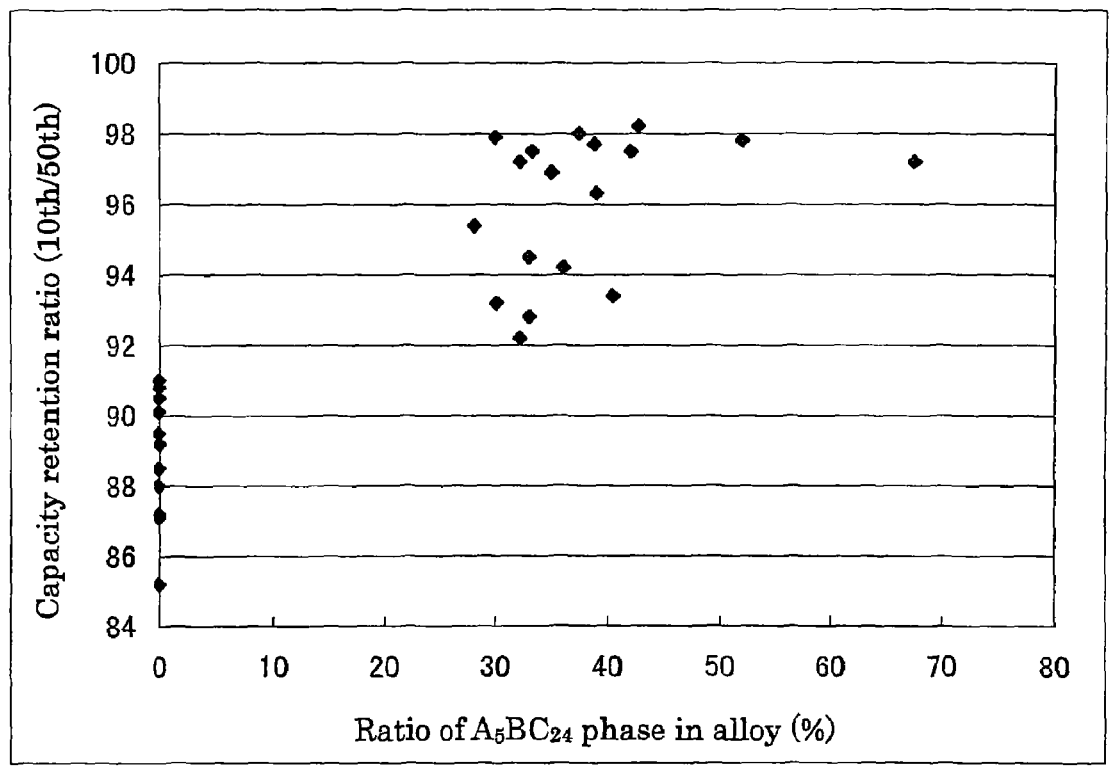
FIG. 5: A graph showing ratios (weight %) of the $A_5 BC_{24}$ phase in hydrogen storage alloys of Examples and Comparative Examples in the abscissa axis and the capacity retention ratios (%) in the ordinate axis.

Further, FIG. 5 shows a graph formed by plotting the ratios (weight %) of the $A_5BC_{24}$ phase in the hydrogen storage alloys in the x-axis and the capacity retention ratios (%) in the y-axis.

TABLE 7

|  | Capacity | Capacity retention ratio |
| --- | --- | --- |
| Example 1 | 334 | 97.2 |
| Example 2 | 328 | 97.9 |
| Example 3 | 328 | 97.9 |
| Example 4 | 325 | 98.2 |
| Example 5 | 325 | 98.0 |
| Example 6 | 323 | 95.1 |
| Example 7 | 322 | 97.5 |
| Example 8 | 319 | 97.8 |
| Example 9 | 320 | 96.3 |
| Example 10 | 319 | 95.2 |
| Example 11 | 326 | 96.9 |
| Example 12 | 321 | 97.5 |
| Example 13 | 322 | 97.2 |
| Example 14 | 327 | 94.5 |
| Example 15 | 330 | 92.2 |
| Example 16 | 329 | 93.4 |
| Example 17 | 327 | 94.5 |
| Example 18 | 301 | 91.8 |
| Example 19 | 302 | 92.8 |
| Example 20 | 305 | 94.2 |
| Example 21 | 310 | 93.2 |
| Example 22 | 318 | 93.1 |
| Example 23 | 320 | 95.4 |
| Example 24 | 319 | 97.7 |
| Example 25 | 318 | 96.9 |
| Example 26 | 322 | 91.5 |
| Example 27 | 325 | 91.6 |
| Example 28 | 330 | 92.8 |
| Example 29 | 332 | 93.4 |
| Example 30 | 321 | 92.5 |
| Example 31 | 324 | 93.1 |
| Example 32 | 328 | 93.6 |
| Example 33 | 332 | 94.1 |
| Example 34 | 317 | 94.1 |
| Example 35 | 320 | 94.3 |
| Example 36 | 309 | 91.6 |
| Example 37 | 315 | 91.9 |
| Example 38 | 325 | 92.1 |
| Example 39 | 330 | 92.1 |
| Example 40 | 328 | 94.1 |
| Example 41 | 330 | 94.2 |
| Example 42 | 320 | 91.7 |
| Example 43 | 321 | 91.9 |
| Example 44 | 322 | 91.9 |
| Example 45 | 325 | 92.0 |
| Example 46 | 321 | 92.1 |
| Example 47 | 323 | 92.2 |
| Example 48 | 321 | 92.0 |
| Example 49 | 322 | 92.5 |
| Example 50 | 317 | 91.9 |
| Example 51 | 320 | 93.2 |

TABLE 8

|  | Capacity | Capacity retention ratio |
| --- | --- | --- |
| Comparative Example 1 | 334 | 88.5 |
| Comparative Example 2 | 328 | 90.8 |
| Comparative Example 3 | 325 | 89.2 |
| Comparative Example 4 | 325 | 91.0 |
| Comparative Example 5 | 323 | 88.0 |
| Comparative Example 6 | 322 | 90.1 |
| Comparative Example 7 | 319 | 87.2 |
| Comparative Example 8 | 320 | 89.2 |
| Comparative Example 9 | 319 | 85.2 |
| Comparative Example 10 | 326 | 88.5 |
| Comparative Example 11 | 321 | 89.5 |
| Comparative Example 12 | 322 | 87.1 |
| Comparative Example 13 | 327 | 88.5 |
| Comparative Example 14 | 330 | 90.5 |

As shown in Tables 7 and 8, in comparison of the hydrogen storage alloys containing the $A_5BC_{24}$ phase of the present invention (Examples 1 to 51) with the hydrogen storage alloys containing no $A_5BC_{24}$ phase (Comparative Examples 1 to 14), it is confirmed that the hydrogen storage alloys containing the $A_5BC_{24}$ phase of the present invention are remarkably improved in the capacity retention ratio as compared with the hydrogen storage alloys containing no $A_5BC_{24}$ phase.

From the above-mentioned experimental results, it was proved that the effect of the present invention can be caused in Examples where Zr, Hf and V were contained in the $A_5BC_{24}$ phase. There is Ti in Group IVa elements to which Zr and Hf belong, and Nb and Ta in Group Va element to which V belongs. In stabilization of a specified crystal structure, it has been known widely that Ti causes the similar effect as that of Zr and Hf in other alloy systems. Similarly, it has also been known widely that Nb and Ta cause the similar effect as that of Nb in stabilization of a specified crystal structure in other alloy systems. Accordingly, in the alloy systems of the present invention, it is supposed that even in the case the $A_5BC_{24}$ phase contains Ti, Nb, or Ta, the similar effect as those caused in the above-mentioned Examples can also be caused.

In conventional hydrogen storage alloys, it has commonly been carried out to insert Cr into Ni sites as a substituent element of Ni similarly to transition metals such as Fe, Co, and Mn. In the present invention, too, it is supposed that if Cr is contained in the C element in the general formula $A_{5-x}B_{1+x}C_{24}$, an effect similar to that of the above-mentioned Examples can also be caused.

Table 9 shows the lattice constants and the composition ratios of A:B:C of the $La_5MgNi_{24}$ phase (same as $A_5BC_{24}$ phase) of the hydrogen storage alloys of Examples 1 to 51 measured by the Rietveld analysis.

TABLE 9

|  | Lattice constant of $La_5MgNi_{24}$ phase | | | Composition ratio of A, B, and C in $La_5MgNi_{24}$ phase | | |
| --- | --- | --- | --- | --- | --- | --- |
|  | a(Å) | c(Å) | c/a | A | B | C |
| Example 1 | 5.031 | 60.56 | 12.04 | 4.7 | 1.3 | 23.9 |
| Example 2 | 5.018 | 60.24 | 12.00 | 4.5 | 1.5 | 23.9 |
| Example 3 | 5.021 | 60.46 | 12.04 | 4.6 | 1.4 | 23.9 |
| Example 4 | 5.024 | 60.71 | 12.08 | 4.7 | 1.3 | 24.0 |
| Example 5 | 5.027 | 61.32 | 12.20 | 4.7 | 1.3 | 24.0 |
| Example 6 | 5.011 | 60.12 | 12.00 | 4.3 | 1.7 | 24.1 |
| Example 7 | 5.012 | 60.34 | 12.04 | 4.3 | 1.7 | 24.1 |
| Example 8 | 5.016 | 60.51 | 12.06 | 4.4 | 1.6 | 24.1 |
| Example 9 | 5.021 | 60.91 | 12.13 | 4.6 | 1.4 | 24.2 |
| Example 10 | 5.010 | 61.10 | 12.20 | 4.2 | 1.8 | 24.2 |
| Example 11 | 5.013 | 61.80 | 12.33 | 4.3 | 1.7 | 24.2 |

TABLE 9-continued

| | Lattice constant of La$_5$MgNi$_{24}$ phase | | | Composition ratio of A, B, and C in La$_5$MgNi$_{24}$ phase | | |
|---|---|---|---|---|---|---|
| | a(Å) | c(Å) | c/a | A | B | C |
| Example 12 | 5.015 | 62.30 | 12.42 | 4.3 | 1.7 | 24.2 |
| Example 13 | 5.017 | 62.70 | 12.50 | 4.5 | 1.5 | 24.2 |
| Example 14 | 5.012 | 60.28 | 12.03 | 4.4 | 1.6 | 24.0 |
| Example 15 | 5.018 | 60.49 | 12.05 | 4.6 | 1.4 | 24.1 |
| Example 16 | 5.021 | 60.65 | 12.08 | 4.6 | 1.4 | 24.1 |
| Example 17 | 5.022 | 60.81 | 12.11 | 4.7 | 1.3 | 24.2 |
| Example 18 | 5.058 | 60.01 | 11.86 | 4.9 | 1.1 | 23.9 |
| Example 19 | 5.059 | 60.21 | 11.90 | 4.9 | 1.1 | 23.9 |
| Example 20 | 5.061 | 60.32 | 11.92 | 5.0 | 1.0 | 24.0 |
| Example 21 | 5.063 | 50.48 | 11.95 | 5.0 | 1.0 | 24.1 |
| Example 22 | 5.078 | 60.00 | 11.82 | 5.0 | 1.0 | 23.8 |
| Example 23 | 5.079 | 50.18 | 11.85 | 5.1 | 0.9 | 23.8 |
| Example 24 | 5.079 | 60.24 | 11.86 | 5.1 | 0.9 | 23.8 |
| Example 25 | 5.081 | 60.56 | 11.92 | 5.1 | 0.9 | 23.9 |
| Example 26 | 4.983 | 57.31 | 11.50 | 4.6 | 1.4 | 24.1 |
| Example 27 | 4.985 | 57.90 | 11.61 | 4.7 | 1.3 | 24.2 |
| Example 28 | 5.025 | 60.48 | 12.04 | 4.8 | 1.2 | 23.9 |
| Example 29 | 5.040 | 60.64 | 12.03 | 4.9 | 1.1 | 23.9 |
| Example 30 | 5.037 | 60.58 | 12.03 | 4.8 | 1.2 | 23.8 |
| Example 31 | 5.043 | 60.86 | 12.07 | 4.8 | 1.2 | 23.8 |
| Example 32 | 5.038 | 60.49 | 12.01 | 4.8 | 1.2 | 23.9 |
| Example 33 | 5.040 | 60.57 | 12.02 | 4.9 | 1.1 | 29.9 |
| Example 34 | 5.031 | 60.33 | 11.99 | 4.7 | 1.3 | 23.8 |
| Example 35 | 5.035 | 60.48 | 12.01 | 4.8 | 1.2 | 23.9 |
| Example 36 | 5.041 | 60.24 | 11.95 | 4.9 | 1.1 | 24.2 |
| Example 37 | 5.046 | 60.61 | 12.01 | 4.9 | 1.1 | 24.1 |
| Example 38 | 5.038 | 60.41 | 11.99 | 4.8 | 1.2 | 24.0 |
| Example 39 | 5.042 | 60.63 | 12.02 | 4.9 | 1.1 | 24.1 |
| Example 40 | 5.051 | 60.48 | 11.97 | 4.9 | 1.1 | 24.0 |
| Example 41 | 5.056 | 60.66 | 12.00 | 4.9 | 1.1 | 23.9 |
| Example 42 | 5.068 | 60.01 | 11.84 | 5.0 | 1.0 | 24.0 |
| Example 43 | 5.072 | 60.08 | 11.85 | 5.1 | 0.9 | 23.8 |
| Example 44 | 5.070 | 60.54 | 11.94 | 5.0 | 1.0 | 23.9 |
| Example 45 | 5.074 | 60.72 | 11.97 | 5.1 | 0.9 | 23.7 |
| Example 46 | 5.071 | 60.53 | 11.94 | 5.0 | 1.0 | 23.9 |
| Example 47 | 5.075 | 60.68 | 11.96 | 5.1 | 0.9 | 23.7 |
| Example 48 | 5.038 | 60.48 | 12.00 | 4.7 | 1.3 | 24.3 |
| Example 49 | 5.043 | 60.69 | 12.03 | 4.8 | 1.2 | 24.2 |
| Example 50 | 5.041 | 60.51 | 12.00 | 4.8 | 1.2 | 24.2 |
| Example 51 | 5.043 | 60.69 | 12.03 | 4.8 | 1.2 | 24.1 |

The description "defined by a general formula $A_{5-x}B_{1+x}C_{24}$" in the first aspect does not mean that the ratio of the amount of C to the total amount of A and B is not allowed to have a margin. It naturally means that the ratio of the amount of C to the total amount of A and B may slightly be shifted from 4 to an extent that the effect of the present invention is not affected. In Examples of the present invention, there are many alloys in which the ratio of the amount of C to the total amount of A and B is slightly shifted from 4. This can be understood from Table 9. The effect of the present invention can be obtained even in these cases.

This application is based on the Japanese patent application (Japanese Patent Application No. 2005-233541) filed on Aug. 11, 2005 and the Japanese patent application (Japanese Patent Application No. 2005-247991) filed on Aug. 29, 2005 and the contents of these applications are hereby incorporated for reference.

The invention claimed is:

1. A hydrogen storage alloy containing a phase of a chemical composition defined by a general formula $A_{5-x}B_{1+x}C_{24}$, wherein
in the general formula $A_{5-x}B_{1+x}C_{24}$, A denotes one or more element(s) selected from rare earth elements; B denotes one or more element(s) selected from a group consisting of Mg, Ca, Sr, and Ba; C denotes one or more element(s) selected from a group consisting of Ni, Co, Mn, Al, Cr, Fe, Cu, Zn, Si, Sn, V, Nb, Ta, Ti, Zr, and Hf; and x denotes a numeral in a range from −0.1 to 0.8; and
the phase has a crystal structure belonging to a space group of R-3m and having a length ratio of the c-axis to the a-axis of the lattice constant in a range of 11.5 to 12.5.

2. The hydrogen storage alloy according to claim 1 having a chemical composition defined by a general formula $R1_aMg_bR2_cR3_d$, wherein
in the general formula $R1_aMg_bR2_cR3_d$, RI denotes one or more element(s) selected from rare earth elements; R2 denotes at least one element of Ni and Co; R3 denotes at least one element of Mn and Al; and a, b, c, and d denote numerals respectively satisfying $16 \leq a \leq 18$, $3 \leq b \leq 6$, $72 \leq c \leq 78$, $1 \leq d \leq 6$, and a+b+c+d=100.

3. The hydrogen storage alloy according to claim 2, wherein the alloy contains La as R1 and both Ni and Co as R2.

4. The hydrogen storage alloy according to claim 1, wherein the crystal grain size of the hydrogen storage alloy is 10 to 100 nm.

5. The hydrogen storage alloy according to claim 1, wherein the phase contains at least one element of Mn and Al.

6. The hydrogen storage alloy according to claim 1, wherein A is one or more element(s) selected from La, Ce, Pr, and Y; B is Mg; and C is one or more element(s) selected from Ni, Co, Mn, Al, Fe, Cu, Zn, Si, Sn, V, Zr, and Hf.

7. A hydrogen storage alloy electrode containing the hydrogen storage alloy according to claim 1 as a hydrogen storage medium.

8. A secondary battery comprising the hydrogen storage alloy electrode according to claim 7 as an anode.

9. A method for producing a hydrogen storage alloy containing a phase of a chemical composition defined by a general formula $A_{5-x}B_{1+x}C_{24}$, wherein
in the general formula $A_{5-x}B_{1+x}C_{24}$, A denotes one or more element(s) selected from rare earth elements; B denotes one or more element(s) selected from a group consisting of Mg, Ca, Sr, and Ba; C denotes one or more element(s) selected from a group consisting of Ni, Co, Mn, Al, Cr, Fe, Cu, Zn, Si, Sn, V, Nb, Ta, Ti, Zr, and Hf; and x denotes a numeral in a range from −0.1 to 0.8; and
the phase has a crystal structure belonging to a space group of R-3m and having a length ratio of the c-axis to the a-axis of the lattice constant in a range of 11.5 to 12.5;
and the method comprises
a first step of producing a melt by heating and melting raw materials in an inert gas atmosphere,
a second step of producing a solidified body by solidifying the melt at a cooling speed of not less than 1000 K/second, and
a third step of annealing the solidified body at 860 to 980° C. in an inert gas atmosphere in a pressurized state.

10. The method for producing the hydrogen storage alloy according to claim 9, wherein the inert gas atmosphere for carrying out the annealing is a helium gas atmosphere.

11. The method for producing the hydrogen storage alloy according to claim 9, wherein the chemical composition of the hydrogen storage alloy to be produced is a chemical composition defined by a general formula $R1_aMg_bR2_cR3_d$ and the raw materials are prepared to satisfy the following: in the general formula $R1_aMg_bR2_cR3_d$, R1 denotes one or more element(s) selected from rare earth elements; R2 denotes at least one element of Ni and Co; R3 denotes at least one element of Mn and Al; and a, b, c, and d denote numerals respectively satisfying $16 \leq a \leq 18$, $3 \leq b \leq 6$, $72 \leq c \leq 78$, $1 \leq d \leq 6$, and a+b+c+d=100.

* * * * *